United States Patent [19]
Ueda

[11] 3,973,580
[45] Aug. 10, 1976

[54] FLOW DIVIDER VALVE
[75] Inventor: Atsumi Ueda, Toyota, Japan
[73] Assignee: Aisin Seiki Kabushiki Kaisha, Japan
[22] Filed: June 10, 1974
[21] Appl. No.: 478,045

[30] Foreign Application Priority Data
June 13, 1973 Japan.................. 48-66620

[52] U.S. Cl............... 137/101; 137/115; 137/118
[51] Int. Cl.² ......................... F16K 11/10
[58] Field of Search ........ 137/101, 115, 116, 118; 91/412

[56] References Cited
UNITED STATES PATENTS

| | | | |
|---|---|---|---|
| 2,737,196 | 3/1956 | Eames.................. | 91/412 X |
| 2,859,762 | 11/1958 | Banker.................. | 137/101 |
| 3,570,519 | 3/1971 | Bianchetta............ | 91/412 X |
| 3,703,186 | 11/1972 | Brewer.................. | 137/101 |

FOREIGN PATENTS OR APPLICATIONS

| | | | |
|---|---|---|---|
| 870,147 | 6/1961 | United Kingdom.......... | 137/101 |

*Primary Examiner*—William R. Cline
*Attorney, Agent, or Firm*—Berman, Aisenberg & Platt

[57] ABSTRACT

A flow divider valve for controlling the fluid quantities to be independently supplied into a first, a second and a third hydraulic circuit from a fluid pressure source comprises a first and a second spool engaged slidably within a cylindrical bore of a casing coaxially to each other to form at their outer ends a first and a second pressure chamber respectively in communication with a first and a second outlet port provided on the casing and to form a third pressure chamber therebetween in open communication with an inlet port provided on the casing, the third pressure chamber being communicated with the first and second hydraulic circuits through a first and a second fixed orifice provided respectively between the third pressure chamber and the first and second outlet ports and annular throttles formed respectively between the first outlet port and the periphery of the first spool and between the second outlet port and the periphery of the second spool, and the first and second spools being biased inwardly to each other to engage the inner ends of the spools to each other to complete the third pressure chamber.

7 Claims, 6 Drawing Figures

FLOW DIVIDER VALVE

BACKGROUND OF THE INVENTION

The present invention relates to a flow divider valve for dividing pressurized fluid discharged from a fluid pump and for supplying the divided fluid respectively to three independent hydraulic circuits, and more particularly to such a flow divider valve as is suitable to be applied to a vehicle for dividing pressurized fluid discharged from a variable fluid pump driven by the prime engine of the vehicle and for supplying the divided fluid to a hydraulically operated power brake, a hydraulically operated power steering device and another hydraulically operated device of the vehicle.

SUMMARY OF THE INVENTION

The prime object of the present invention is to provide a flow divider valve to divide pressurized fluid discharged from a variable fluid pump driven by a prime engine of a vehicle; to supply the divided fluid in respectively predetermined quantities to a first and a second independent hydraulic circuit regardless of any pressure or back-pressure produced respectively in the first and second hydraulic circuits; and to supply the remaining pressurized fluid to a third hydraulic circuit.

Another object of the present invention is to provide a flow divider valve to divide pressurized fluid discharged from a variable fluid pump driven by a prime engine of a vehicle; to supply the divided fluid in respectively predetermined quantities to a first and a second independent hydraulic circuit regardless of any pressure or back-pressure exerted in the first and second hydraulic circuits; and to supply the remaining pressurized fluid to a return hydraulic circuit in communication with a fluid reservoir.

Still another object of the present invention is to provide a flow divider valve, having the above-mentioned characteristics, wherein control means for regulating pressurized fluid from the variable fluid pump to the predetermined flow quantities is installed integrally within the valve so as to minimize pressure loss caused by the fluid flow quantity control.

BRIEF DESCRIPTION OF THE DRAWINGS

These and further objects, features and advantages of the present invention will become more apparent when reading the following detailed description of the invention by reference to the accompanying drawings illustrative of several preferred embodiments of the invention.

In the drawings.

DESCRIPTION OF THE PREFERRED ENBODIMENTS

Figure 1:
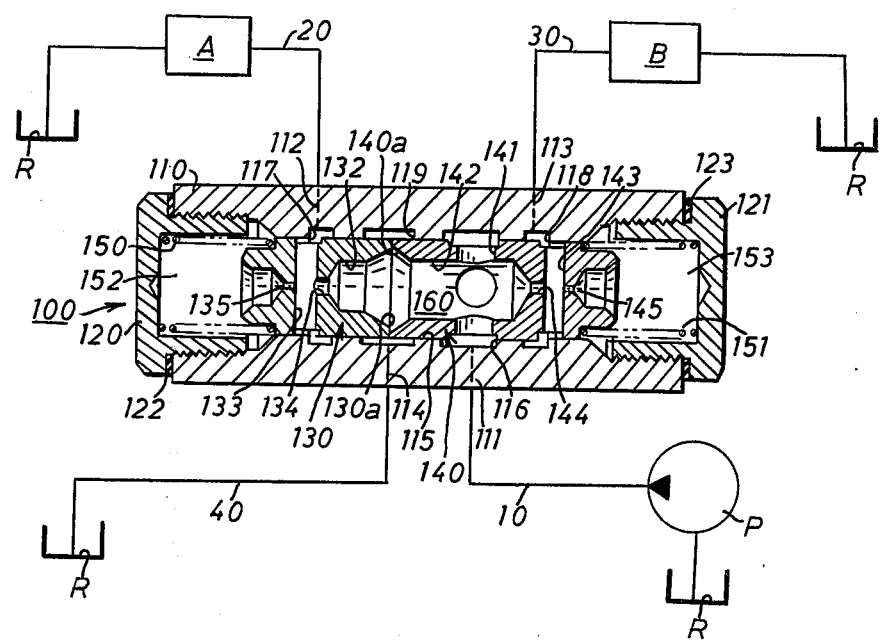
FIG. 1 is a schematic and substantially sectional view of the arrangement for a flow divider valve in accordance with the present invention.

Referring now to the accompanying drawings and particularly to FIG. 1, there is disclosed a first preferred embodiment of a flow divider valve 100 in accordance with the present invention. In FIG. 1, the flow divider valve 100 is applied to divide and supply pressurized operation fluid discharged from a variable fluid pump P driven by a prime engine of a vehicle to a first and a second hydraulic circuit respectively for a hydraulically operated power steering device A and a hydraulically operated brake device B.

The flow divider valve 100 comprises a casing 110 provided thereon with an inlet port 111 connected to the pump P through a conduit 10, a first outlet port 112 in open communication with the power steering device A through a conduit 20, a second outlet port 113 in open communication with the power brake device B through a conduit 30, and a third outlet port 114 connected to a fluid reservoir R by way of a conduit 40. The casing 110 includes therein a cylindrical bore 115 which is provided thereon with four annular grooves 116, 117, 118 and 119. These annular grooves 116, 117, 118 and 119 are in communication with the inlet port 111, the first, the second and the third outlet ports 112, 113 and 114 respectively. Both ends of the casing 110 are closed with plugs 120 and 121 respectively threaded in the left and right ends of the casing 110 through sealing members 122 and 123. Spools 130 and 140 are axially slidable within the casing bore 115 and face to each other at the right side-face and the left-side-face respectively thereof. These spools 130 and 140 are normally biased inwardly respectively by springs 150 and 151 interposed between the left side-face of the spool 130 and the plug 120 and between the right side-face of the spool 140 and the plug 121. A first and a second pressure chambers 152 and 153 are formed respectively between the spool 130 and the interior of the plug 120 and between the spool 140 and the interior of the plug 121.

The spool 140 is provided therein with a cylindrical bore 142 which is connected to the annular groove 116 through openings 141 radially drilled through the peripheral wall of the spool 140. Another radial communication hole 143 is drilled through the spool 140 at its rightward portion. Fixed orifices 144 and 145 are provided respectively between the cylindrical bore 142 and the radial hole 143, and between the second pressure chamber 153 and the radial hole 143.

The spool 130 is provided with a cylindrical bore 132 which cooperates with the cylindrical bore 142 of the spool 140 to form a third pressure chamber 160. A radial communication hole 133 is drilled through the spool 130 at its leftward portion. Fixed orifices 134 and 135 are provided respectively between the cylindrical bore 132 and the radial hole 133, and between the first pressure chamber 152 and the radial hole 133.

In the flow divider valve 100, a return circuit to discharge therethrough the operation fluid into the reservior R will be completed when the fluid pressure produced within the third pressure chamber 160 displaces the spools 130 and 140 leftward and rightward against the biasing forces of the springs 150 and 151 respectively.

Operation of the low divider valve 100 of the abovedescribed construction will be explained in detail hereinafter. While both of the power steering device A and the power brake device B are conditioned to their inoperative states, the operation fluid supplied into the third pressure chamber 160 from the pump P through the conduit 10, the inlet port 111, the annular groove 116 and the openings 141 in sequence flows into the first hydraulic circuit for the power steering device A by way of the fixed orifice 134 of the spool 130, the radial hole 133, the annular groove 117 and the first outlet port 112 in sequence. Simultaneously, the fluid within the third pressure chamber 160 is supplied into the second hydraulic circuit for the power brake device B by way of the fixed orifice 144 of the spool 140, the radial hole 143, the annular groove 118 and the second outlet port 113 in sequence. Thus, pressure differences are produced at the both sides of the spools 130 and 140 by the function of the fixed orifices 134 and 144. When the fluid flow quantities passing through the fixed orifices 134 and 144 reach respective predetermined values, the spools 130 and 140 are given thrusting forces to balance the biasing forces of the springs 150 and 151. When the said fluid flow quantities exceed the predetermined ones, the spools 130 and 140 start to displace leftward and rightward against the biasing forces of the springs 150 and 151 respectively. Communication between the radial hole 133 and the annular groove 117 and between the radial hole 144 and the annular groove 118, are throttled by the displacements of the spools 130 and 140 to regulate the quantities of the operation fluid discharged from the radial holes 133 and 143. Simultaneously, valve portions 130a and 140a open the third pressure chamber 160 to regulate the fluid flow quantities passing through the fixed orifices 134 and 144 to the predetermined ones. Consequently, the excessive fluid discharged from the pump P is returned to the reservoir R through the valve portions 130a and 140a, the third outlet port 114 and the conduit 40.

Operation of the power steering device A under the mentioned state increases fluid pressure within the first hydraulic circuit. This makes the flow resistance larger in the first hydraulic circuit than in the second hydraulic circuit. Now within the the flow divider valve 100, the spool 130 is moved rightward by the pressure exerted within the first hydraulic circuit, thereby to close the valve portions 130a and 140a respectively of the spools 130 and 140. At the same time, the flow quantity is reduced and increased respectively at the fixed orifices 134 and 144. This causes rightward displacement of both spools 130 and 140. This displacement increases the flow resistance towards the second hydraulic circuit by throttling operation between the annular groove 118 and the radial hole 143. This throttling operation lasts till the pressure value within the second pressure chamber 153 exceeds the one within the third pressure chamber 160 by an amount $\Delta P$ representing (Biasing Force of the spring 151/Effective Pressure Receiving Area of the spool 140). Sequentially, the pressure value within the third pressure chamber 160 increases to be equal to the total value of the pressure necessary for the first hydraulic circuit and the amount $\Delta P$ representing (Biasing Force of the spring 150/Effective Pressure Receiving Area of the spool 130), thereby to regulate the flow quantities towards the first and second hydraulic circuits at the predetermined ones. In the case that the pressurized fluid supplied into the third pressure chamber 160 is further increased to increase in turn the fluid quantities passing through the fixed orifices 134 and 144, the amount $\Delta P$ is increased and the spools 130 and 140 are disposed respectively leftward and rightward. Consequently, the valve portions 130a and 140a open to discharge the excessive fluid into the reservoir R to regulate the fluid flow quantities passing through the fixed orifices 134 and 144 at their predetermined values.

When the power brake device B is operated instead of the power steering device A in the state previously described, the pressure value within the second hydraulic circuit is increased. Then, the spools 130 and 140 are both displaced to the left. The following operations are substantially the same as those which occur when the power steering device A is operated except in the opposite direction and no repetition is necessary.

When both of the power steering device A and the power brake device B are operated at one time, the operations are substantially same as those while the both devices A and B are conditioned to their inoperative states and here also no repetition is necessary.

Figure 2:
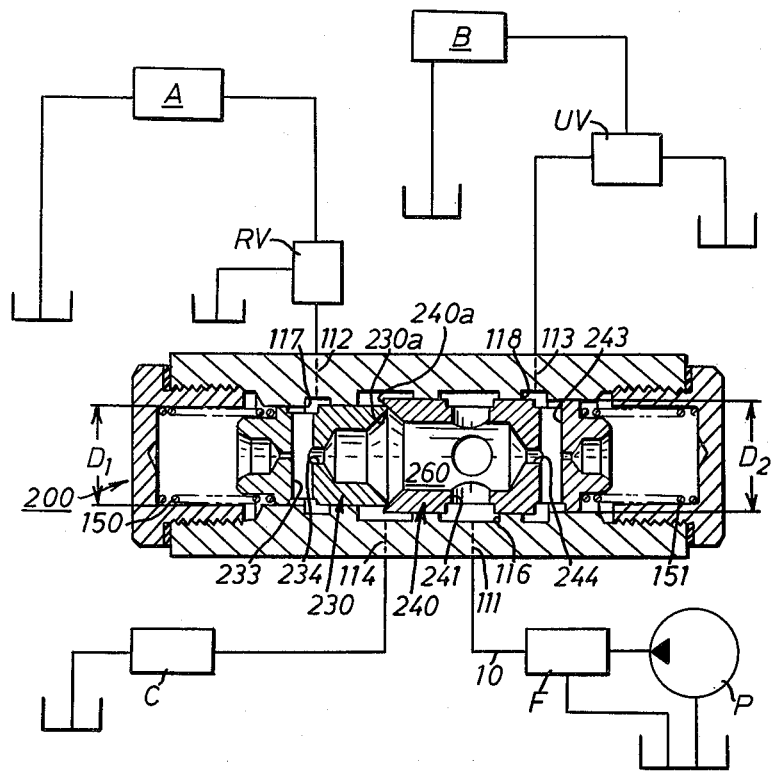
FIG. 2 is a schematic and substantially sectional view of the arrangement for a second embodiment of the present invention.

A second preferred embodiment of a flow divider valve in accordance with the present invention is disclosed hereinafter in reference to FIG. 2. A flow divider valve 200 of this second embodiment is characterized by provision of spools 230 and 240 in place of the spools 130 and 140 of the first embodiment, a valve portion 240a of the spool 240 having a cross-sectional area $D_2$ thereof which is larger than a cross-sectional area $D_1$ of a valve portion 230a of the spool 230. The flow divider valve 200 is further characterized in that a flow regulator valve F is interposed between the pump P and the inlet port 111, a relief valve RV is interposed between the power steering device A and the first outlet port 112, an unloader valve UV is interposed between the power brake device B and the second outlet port 113 and a third hydraulic circuit is provided to connect the third outlet port 114 with such conventional hydraulically operated devices C as a height adjustor, a seat positioning adjustor, window regulators, an anti-skid device and the like. All other constructions remain substantially the same as those of the flow divider valve 100 of the first preferred embodiment. Thus, the same or similar reference numerals and charactors are used for the same and similar component portions and the no repetition of the description of the construction is made herein.

Described below in detail is the operation of the flow divider valve 200 of the second preferred embodiment. While all of the three hydraulically operated devices A, B and C are conditioned to their inoperative states, the pressurized fluid discharged from the pump P is controlled at a predetermined flow ratio by the flow regulator valve F and supplied into a third pressure chamber 260 by way of the conduit 10, the inlet port 111, the annular groove 116 and openings 241 in sequence. The pressurized fluid then flows into the first hydraulic circuit for the power steering device A by way of a fixed orifice 234 of the spool 230, a radial hole 233 drilled through the spool 230, the annular groove 117, the first outlet port 112, and the relief valve RV in sequence. Simultaneously, the pressurized operation fluid is delivered into the second hydraulic circuit for the power brake B by way of a fixed orifice 244 of the spool 240, a radial hole 243 drilled through the spool 240, the annular groove 118, the second outlet port 113 and the unloader valve UV in sequence. Thus, pressure differences are produced at the both ends of the spools 230 and 240 by the functioning of the fixed orifices 234 and 244. When the fluid flow quantities passing through the fixed orifices 234 and 244 reach respective predetermined values, the spools 230 and 240 are given thrusting forces which to balance the biasing forces of the springs 150 and 151. When the said fluid flow quantities exceed the predetermined values, the spools 230 and 240 start to displace in opposite directions against the biasing forces of the springs 150 and 151. Between the radial hole 233 and the annular groove 117 and between the radial hole 243 and the annular groove 118, throttled in response to the displacements of the spools 230 and 240 are the quantities of operation fluid discharged from the radial holes 233 and 243. Simultaneously, the valve portions 230a and 240a of the spools and 240 open the third pressure chamber 260 to regulate the fluid flow quantities passing through the fixed orifices 234 and 244 to the predetermined values. Consequently, the remaining operation fluid from the pump P is supplied into the third hydraulic circuit for the hydraulically operated device C by way of the valve portions 230a and 240a and the third outlet port 114.

Under the above-mentioned state, operation of the device C increases the pressure value within the third hydraulic circuit. And as in the case of the flow divider valve 100 of the first preferred embodiment, the spools 230 and 240 are further displaced leftward and rightward by the pressure produced within the third hydraulic circuit. In this instance, the fluid pressure exerted within the third hydraulic circuit acts as a rightward thrusting force onto the spool 240. Consequently, when a pressure is produced within the third hydraulic circuit, the fluid supply quantity to the second hydraulic circuit decreases and the decreased quantity is added to the fluid quantity supplied into the third hydraulic circuit.

All the other operations of the valve 200 are substantially same as those of the flow divider valve 100 of the first embodiment and no repetition of the description of the operations is made hereinafter.

Figure 3:
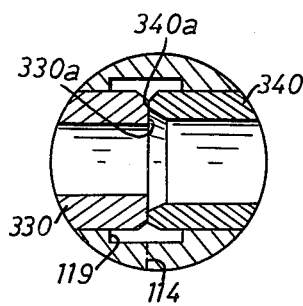
FIG. 3 is an enlarged substantially sectional view of a modification of the second embodiment shown in FIG. 2.

FIG. 3 is referred to for a first modification of the first preferred embodiment in respect with the second preferred embodiment. The first modification is featured by spools 330 and 340 to replace the spool 130 and 140 of the first embodiment; the seat portions 330a and 340a respectively of the spools 330 and 340 have diameters smaller than the diameters of the spools 330 and 340. All the other structural characteristics are substantially the same as those of the flow divider valve 100 of the first embodiment and their description is not repeated.

The operation of the first modification is as follows. While all the three hydraulically operated device A, B and C are conditioned to their inoperative states, the same operation processes take place as in the case of the second preferred embodiment. When the device C is operated, however, the pressure within the third hydraulic circuit is increased. This increased pressure acts on the outer peripheries of the seat portions 330a and 340a respectively of the spools 330 and 340 to decrease the fluid quantities supplied into the first and second hydraulic circuits as compared to the quantities supplied when no pressure is produced within the third hydraulic circuit. A fluid quantity equal to the reduced amounts is added to the fluid quantity supplied into the third hydraulic circuit.

Figure 4:
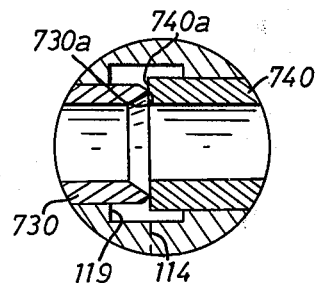
FIG. 4 is an enlarged substantially sectional view of another modification of the second embodiment.

FIG. 4 is referred to for a second modification of the second preferred embodiment. This second modification is characterized in that spools 730 and 740 replace respectively the spools 230 and 240 of the flow divider valve 200. The spool 740 is provided with a diameter larger than that of the spool 730 and the diameter of the seat portion 730a of the spool 730 is smaller than that of the spool 730. All other structural features remain unchanged from the second preferred embodiment and their description is not repeated.

Figure 5:
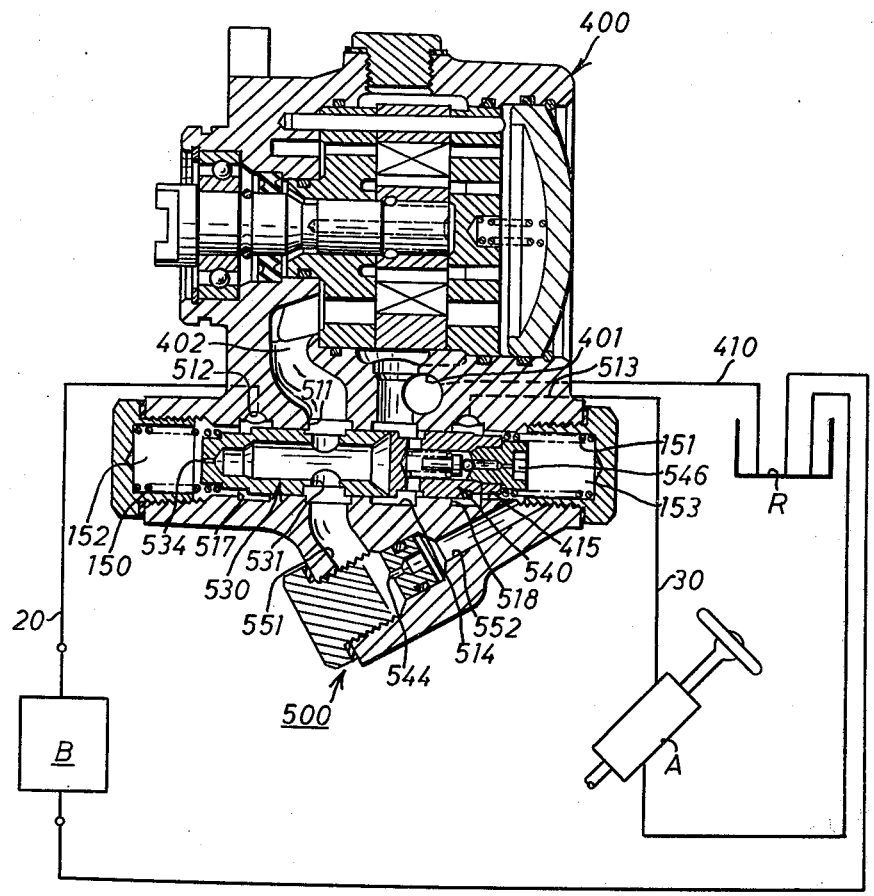
FIGS. 5 and 6 are schematic and substantially sectional views of the arrangements for other embodiments off the present invention.

A third preferred embodiment of a flow divider valve 500 in accordance with the present invention is disclosed hereinafter in reference to FIG. 5, wherein the flow divider valve 500 is integrally assembled within a conventional vane pump 400. An inlet port 401 of the pump 400 is connected to the reservoir R by way of a conduit 410 and an outlet port 402 of the pump 400 is in communication with an inlet port 511 of the valve 500. First, second and third outlet ports 512, 513 and 514 are respectively connected to the power brake device B through the conduit 20, the power steering device A through the conduit 30, and the reservoir R by way of the inlet port 401 of the pump 400 and the conduit 410.

The flow divider valve 500 is provided with spools 530 and 540 corresponding respectively to the spools 130 and 140 of the first preferred embodiment. These spools 530 and 540 are, therefore, axially slidable within a cylindrical bore 415 of the pump housing and face to each at the right side and left side faces thereof. The spool 530 is provided with a fixed orifice 534 corresponding to the fixed orifice 134 of the first embodiment and openings 531 corresponding to the openings 141 of the first embodiment. An annular orifice is formed between the leftward outer periphery of the spool 530 and an annular groove 517.

Within the spool 540, the pressurized fluid applied thereon through a fixed orifice 544 interposed between passages 551 and 552 is supplied into the second hydraulic circuit for the power steering device A by way of an annular orifice formed between the outer periphery of the spool 540 and an annular groove 518 and the second outlet port 513. The spool 540 includes therein a conventional relief valve 546. All other constructions are substantially same as those of the first preferred embodiment.

With the device of the above described construction, when the vane pump 400 is driven with the hydraulically operated devices A and B conditioned to their inoperative states, operation fluid within the reservoir R is supplied into the cylindrical interior of the spool 530 by way of the conduit 410, the inlet port 401, the discharge port 402, the inlet port 511 of the valve 500 and the openings 531 of the spool 530 in sequence. The pressurized fluid, then, flows into the first hydraulic circuit for the power brake device B by way of the fixed orifice 534, the first pressure chamber 152, the annular groove 517 and the first outlet port 512 in sequence. Simultaneously, the pressurized fluid into the second hydraulic circuit for the power steering device A by way of the communication passage 551, the fixed orifice 544, the communication passage 552, the second pressure chamber 153, the annular groove 518 and the second outlet port 513 in sequence. Thus, pressure differences are produced at the both ends of the spools 530 and 540 by the functioning of the fixed orifices 534 and 544. When the fluid quantities passing through the fixed orifices 534 and 544 reach their respective predetermined values, the spools 530 and 540 attain thrusting forces to balance the biasing forces of the springs 150 and 151 respectively.

When the said fluid flow quantities exceed the predetermined values, the spools 530 and 540 start to displace leftward and rightward against the biasing forces of the springs 150 and 151 respectively. Thus, between the spool 530 and the annular groove 517 and between the spool 540 and the annular groove 518, throttled in response to the displacements of the spools 530 and 540 flow the pressurized fluids discharged from the first and second pressure chambers 152 and 153. In this instance, a third pressure chamber formed between the cylindrical bore of the spool 530 and the left face of the spool 540 is opened to regulate the fluid flow quantities passing through the fixed orifices 534 and 544 to their predetermined valves. And the remaining operation fluid discharged from the pump 400 is delivered into the third outlet port 514 through the valve portions of the spools 530 and 540, thereby to be sucked ultimately into the pump 400.

All of the other operations are substantially same as those already described in detail with reference to the first preferred embodiment and will not be again described.

Figure 6:
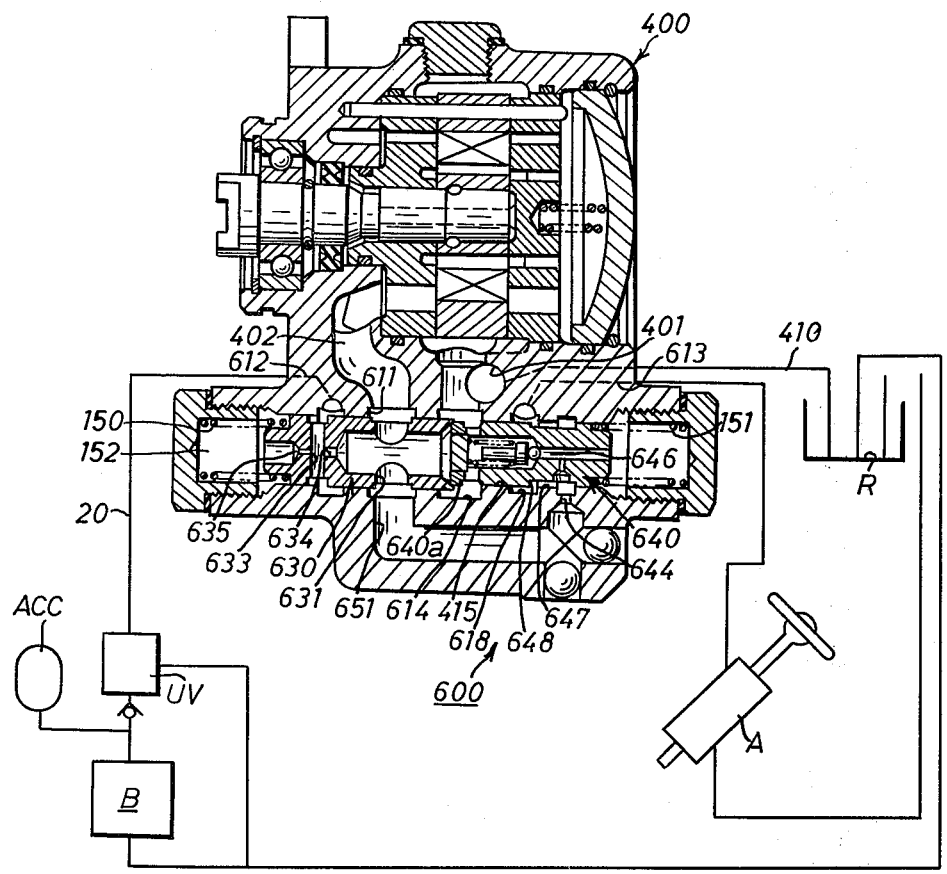

A modification of the third preferred embodiment is disclosed in FIG. 6. This modification is characterized in that a flow divider valve 600 includes spools 630 and 640 corresponding to the spools 130 and 140 of the flow divider valve of the first embodiment. The spools 630 and 640 are axially slidable within the cylindrical bore 415 of the pump housing and engages to each other at the right and left faces thereof. Furthermore, the spool 630 is provided with openings 631 corresponding to the openings 141 of the spool 140 of the flow divider valve 100 disclosed as the first preferred embodiment.

Around the spool 640, the pressurized fluid from the openings 631 of the spool 630 is supplied into the second hydraulic circuit for the power steering device A by way of a communication passage 651, a fixed orifice 644 opening to the bore 415, an annular passage formed between the outer periphery of the spool 640 and the bore 415, an annular orifice formed between a shoulder portion 648 of the spool 640 and the annular groove 618, and the second outlet port 613. The diameter of a valve portion 640a of the spool 640 exposed in the third outlet port 614 is designed smaller and a conventional relief valve 646 is assembled within the spool 640. All the other structural features are substantially the same as those of the third preferred embodiment and the same and similar reference numerals are used for the same and similar component parts and portions. No further explanation of the structure is made herein. Moreover, operation of this modification is substantially same as that of the third preferred embodiment.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A flow divider valve for controlling fluid quantities to be independently supplied into first, second, and third hydraulic circuits from a fluid pressure source, comprising:
    a valve casing (110);
    an inlet port (111) provided on said valve casing and in fluid communication with said fluid pressure source;
    first, second, and third outlet ports (112-114) provided on said valve casing and in fluid communication with said first, second, and third hydraulic circuits, respectively;
    first and second valve spools (130, 140) slidably disposed within said casing coaxially to each other;
    a first orifice (134) provided within said first valve spool between said inlet port and said outlet port;
    first fluid passage means permanently communicating said fluid pressure source with said first hydraulic circuit through said inlet port, said first orifice, and through said outlet port;
    a second orifice (144) provided within said second valve spool between said inlet port and said second outlet port;
    second fluid passage means permanently communicating said fluid pressure source with said second hydraulic circuit through said inlet port, said second orifice, and through said second outlet port;
    first and second biasing means (150, 151) for biasing said firt and second valve spools inwardly to engage the inner ends of said spools to each other;
    a first throttle valve means (117) provided between said first outlet port and said first orifice within said first fluid passage means and throttling said first outlet port upon sliding movement of said first valve spool;
    a second throttle valve means (118) provided between said second outlet port and said second orifice within said second fluid passage means and throttling said second outlet port upon sliding movement of said second valve spool; and
    third fluid passage means communicating said fluid pressure source with said third hydraulic circuit through said inlet port and said third outlet port upon sliding movement of said first and second valve spools due to the pressure differences occurred by said first and second orifices.

2. A flow divider valve as claimed in claim 1, wherein each of said first and second hydraulic circuits includes therein a hydraulically operated device and said third hydraulic circuit is communicated with a fluid reservoir.

3. A flow divider valve as claimed in claim 1, wherein each of said first, second and third hydraulic circuits includes therein a hydraulically operated device.

4. A flow divider valve as claimed in claim 1, wherein said first orifice is provided on said first spool at its substantial axial center and is positioned between said third pressure chamber and said first outlet port and said second orifice is disposed within a passage provided within said casing to connect said second pressure chamber to said third pressure chamber.

5. A flow divider valve for controlling the fluid quantities to be independently supplied into first, second and third hydraulic circuits from a fluid pressure source, comprising a valve casing having a bore therein closed at its ends, an inlet port in said casing for connection to the fluid pressure source, first, second and third outlet ports for connection respectively to the first, second and third hydraulic circuits, first and second valve spools slidably disposed in said bore of the casing coaxially to each other and forming between their outer ends and the closed ends of the casing first and second pressure chambers in communication with said first and second outlet ports respectively, each of said valve spools having a hollow portion opening to its inner end and an outwardly disposed wall closing the hollow portion, said hollow portions together forming a third pressure chamber, an opening in the wall of one of said valve spools communicating said third pressure chamber with said inlet port, said third pressure chamber being communicated with said first and second pressure chambers by first and second permanently open orifices provided in said outwardly disposed walls of said valve spools, annular throttles formed respectively between said first outlet port and the periphery of said first spool and between said second outlet port and the periphery of said second spool, first and second means biasing said first and second valve spools inwardly toward one another to engage the inner ends of said spools against each other to close said third pressure chamber and to block the fluid communication between said inlet port and said third outlet port through the third compression chamber until said first and second spools are shifted against said biasing means, said first valve spool being shiftable in outward direction in response to a predetermined pressure drop across said first orifice to limit the flow rate out of said first outlet port, and said valve spool being shiftable in the other direction in response to a predetermined pressure drop across the second orifice to limit the flow rate out of said second outlet port, whereby said third outlet port is selectably connected with said third pressure chamber and said inlet port only when said first and second valve spools are shifted in opposite directions due to the pressure drops across said first and second orifices.

6. A flow divider valve as claimed in claim 5, wherein said first spool valve is provided at its inner end with a seat portion whose effective pressure receiving area for the back pressure from said third hydraulic circuit is smaller than that of said second spool.

7. A flow divider valve as claimed in claim 5, wherein said first and second orifices are provided respectively on said first and second spools at their substantial axial centers and are located between said third pressure chamber and said first and second outlet ports respectively.

* * * * *